(12) United States Patent
Gielen

(10) Patent No.: US 12,048,074 B2
(45) Date of Patent: Jul. 23, 2024

(54) LIGHT EMITTING DIODE, LED, BASED LIGHTING DEVICE ARRANGED FOR EMITTING A PARTICULAR EMITTED LIGHT FOLLOWING A PLANCKIAN LOCUS IN A COLOR SPACE

(71) Applicant: SIGNIFY HOLDING B.V., Eindhoven (NL)

(72) Inventor: Herman Johannes Gertrudis Gielen, Valkenswaard (NL)

(73) Assignee: SIGNIFY HOLDING B.V., Eindhoven (NL)

( * ) Notice: Subject to any disclaimer, the term of this patent is extended or adjusted under 35 U.S.C. 154(b) by 130 days.

(21) Appl. No.: 17/774,040

(22) PCT Filed: Nov. 3, 2020

(86) PCT No.: PCT/EP2020/080745
§ 371 (c)(1),
(2) Date: May 3, 2022

(87) PCT Pub. No.: WO2021/089503
PCT Pub. Date: May 14, 2021

(65) Prior Publication Data
US 2022/0386431 A1    Dec. 1, 2022

(30) Foreign Application Priority Data

Nov. 7, 2019 (EP) .................. 19207573
Nov. 19, 2019 (EP) .................. 19210111

(51) Int. Cl.
*H05B 45/3577* (2020.01)
*H05B 45/20* (2020.01)
*H05B 45/40* (2020.01)

(52) U.S. Cl.
CPC ......... *H05B 45/3577* (2020.01); *H05B 45/20* (2020.01); *H05B 45/40* (2020.01)

(58) Field of Classification Search
None
See application file for complete search history.

(56) References Cited

U.S. PATENT DOCUMENTS

2013/0038222 A1   2/2013   Yeh et al.
2013/0300305 A1* 11/2013   Wray .................. H05B 45/40
                                               315/210

FOREIGN PATENT DOCUMENTS

DE       102012200711 A1    10/2012
WO      2018166856 A1    9/2018
WO      WO-2018166856 A1 *    9/2018    ......... H05B 33/0827

* cited by examiner

*Primary Examiner* — Anh Q Tran

(57) ABSTRACT

A Light Emitting Diode, LED, based lighting device arranged for emitting a particular emitted light following a Planckian locus in a color space, the LED based lighting device comprises a first LED channel comprising a plurality of LEDs, wherein the first LED channel is tuned to emit light having a first chromaticity in the color space, a second LED channel comprising a plurality of LEDs, wherein the second LED channel is tuned to emit light having a second chromaticity in the color space, a controller for activating the first and the second LED channel such that LED based lighting device emits light having a color in between the first and the second chromaticity in the color space, wherein the LED based lighting device further comprises a third LED channel connected in between the at least two LED channels, wherein the third LED channel comprises one or more LEDs and wherein the third LED channel is tuned to emit light having a third chromaticity in the color space, wherein the third LED channel effectuates that at least one LED of the second LED channel is activated when the first channel is actuated, thereby ensuring that the emitted light follows (Continued)

the Planckian locus in the color space in between the first and the second chromaticity in the color space.

12 Claims, 5 Drawing Sheets

LIGHT EMITTING DIODE, LED, BASED LIGHTING DEVICE ARRANGED FOR EMITTING A PARTICULAR EMITTED LIGHT FOLLOWING A PLANCKIAN LOCUS IN A COLOR SPACE

CROSS-REFERENCE TO PRIOR APPLICATIONS

This application is the U.S. National Phase application under 35 U.S.C. § 371 of International Application No. PCT/EP2020/080745, filed on Nov. 3, 2020, which claims the benefits of European Patent Application No. 19210111.1, filed on Nov. 19, 2019 and European Patent Application No. 19207573.7, filed on Nov. 7, 2019. These applications are hereby incorporated by reference herein.

FIELD OF THE INVENTION

The present disclosure related to a Light Emitting Diode, LED, based lighting device arranged for emitting a particular color light, wherein the light color may be set using two color set points, and wherein a color curve between those color set points follow the Planckian locus.

BACKGROUND

Lighting devices have been developed that make use of Light Emitting Diodes, LEDs, for a variety of lighting applications. Owing to their long lifetime and high energy efficiency, LED lamps are nowadays also designed for replacing traditional fluorescent lamps, i.e. for retrofit applications. For such an application, a retrofit LED lamp is typically adapted to fit into the socket of the respective lamp fixture to be retrofitted. Moreover, since the maintenance of a lamp is typically conducted by a user, the retrofit LED lamp should ideally be readily operational with any type of suitable fixture without the need for re-wiring the fixture.

The present disclosure is related to multi-channel, in particular two channel, LED based lighting devices. Each channel may comprise a plurality of LEDs that are capable of emitting light at a particular color. For example a first channel may be directed to emit red emitted light. A second channel may be directed to emit green emitted light and a third channel may be directed to emit blue emitted light.

In such lighting devices, a fixed voltage source may be used to power the LEDs in each of the channels. The current through each of the channels may be set in the factory by tuning a resistor which is placed in series with the LEDs of a particular channel. One of the downsides of such an approach is related to several disturbing factors such as voltage variations of the power source, cable lengths, i.e. impedances, interactions between channels which may cause errors for the targeted flux and color point.

Another option is that a current source is used to power the LEDs in each of the channels. A controller may activate the LED channels with a particular ratio to ensure that a particular emitted light is emitted.

More specifically, typically, there is a controller to control a plurality of switches, wherein each of the switches is arranged to enable a particular LED channel. For example, a first switch may enable a red channel, a second switch may enable a green channel, a third switch may enable a blue channel, etc. The switches may be provided width Pulse Width Modulation, PWM, signals having particular duty cycles. The frequency of the PWM signals should be chosen such that it exceeds the refresh rates of the human eye. This would prevent a user from seeing any flickering. By controlling the duty cycle, the contribution of each of the channels to the total amount of light emitted can be controlled, and thus also the color of the light that is emitted by the LED based lighting device.

In present two-channel LED based lighting devices, the color point is tuned by changing the current ratio between the two channels. For example, one channel may have LEDs that are arranged to emit light having a color temperature of 2700K and another channel may have LEDs that are arranged to emit light having a color temperature of 6500K.

One of the disadvantages of the above described two-channel LED based lighting device is that the color point of the emitted light of the LED based lighting device can be tuned along a straight line in the color space. This may result in color perception issues as the colors may, for example, look reddish.

SUMMARY

It would be advantageous to achieve a Light Emitting Diode, LED, based lighting device arranged for emitting a particular emitted light following a Planckian locus in a color space.

In a first aspect, there is provided a Light Emitting Diode, LED, based lighting device arranged for emitting a particular emitted light following a Planckian locus in a color space. The LED based lighting device comprises:
  a first LED channel comprising at least one LED, wherein the first LED channel is tuned to emit light having a first chromaticity in the color space;
  a second LED channel comprising at least one LED, wherein the second LED channel is tuned to emit light having a second chromaticity in the color space;
  a controller for activating the first and the second LED channel such that the LED based lighting device emits light having a color in between the first and the second chromaticity in the color space;
wherein the LED based lighting device further comprises:
  a third LED channel connected in between an input of the first LED channel and an input of the second LED channel, wherein the third LED channel comprises at least one LED and wherein the third LED channel is tuned to emit lighting having a third chromaticity in the color space, wherein the third LED channel effectuates that the at least one LED of the second LED channel is activated when the first channel is actuated.

The light may thus be characterized with a color point (x1,y1) in the color of the color space.

In accordance with the present disclosure, the Planckian locus, or black body locus, is the path or locus that the color of an incandescent black body would take in a particular chromaticity space as the blackbody temperature changes. It goes from deep red at low temperatures through orange, yellowish white, white, and finally bluish white at very high temperatures.

The inventors have found that a user may perceive a natural color transition when the emitted light follows the Planckian locus in the color space. In the prior art, the color transition between the two LED channels is demonstrated as a straight line in the color space between the set points of the two LED channels. This may be perceived as undesirable.

In accordance with the present disclosure, a color space may be viewed as a three-dimensional space. That is, a color may be specified by a set of three numbers, for example the CIE coordinates X, Y, and Z, or other values such as hue, colorfulness, and luminance, which specify the color and brightness of a particular homogeneous visual stimulus.

A chromaticity is a color projected onto a two-dimensional space that ignores brightness. For example, the standard CIE XYZ color space projects directly to the corresponding chromaticity space specified by the two chromaticity coordinates known as x and y, making up for the CIE chromaticity diagram.

In accordance with the present disclosure, chromaticity is an objective specification of the quality of a color regardless of its luminance. Chromaticity may consist of two independent parameters, for example specified as hue and colorfulness, where the latter is alternatively called saturation, chroma, intensity, or excitation purity. This number of parameters follows from trichromacy of vision of most humans, which is assumed by most models in color science.

Following the above, it was the insight of the inventors that the controller should be able to control the channels in such a way that the color that is emitted by the LED based lighting device follows the Planckian locus in the color space.

It is noted that the present disclosure makes use of the forward voltage to current characteristics of the LED for introducing a non-linearity. This concept is better explained in more detail here below.

It is further noted that with the concept of the recent disclosure, the resulting line in color space may not exactly follow the Planckian locus but can be better matched to the Planckian locus compared to the conventional straight line.

In an example, a sum of a forward voltage of the second LED channel and a forward voltage of the third LED channel is equal to a forward voltage of the first LED channel. This provides the most optimum control of the current distribution between the three LED channels In an example, the first LED channel comprises a plurality of LEDs and wherein the second LED channel comprises a plurality of LEDs and the third LED channel is connected, at a first end, in between the plurality of LEDs of the first LED channel and, at a second end opposite to the first end, in between the plurality of LEDs of the second LED channel.

One of the objectives of the above described examples is that a non-linearity is introduced when activating the first LED channel. Current flowing through the first LED channel will also flow through a part of the second LED channel, via the third LED channel. The LED current may thus be divided into two current. A first current may continue to flow in the first LED channel by flowing through the remainder of the LEDs present in the first LED channel and a second flow may flow via the third LED channel towards the second LED channel, and may flow via one or more LEDs present in the second LED channel.

In a further example, the number of in series cascaded LEDs in the first channel that are connected with their anode side to the first end of the third LED channel equals the number of in series connected LEDs in the third LED channel plus the number of in series connected LEDs in the second LED channel that are connected with their anode side to the second end of the third LED channel.

It was found that it may be beneficial to assure that the total number of LEDs through which the first current flows equals the total number of LEDs through which the second current flows.

In a further example:
the first LED channel comprises five initial LEDs followed by ten subsequent LEDs;
the second LED channel comprises five initial LEDs followed by five subsequent LEDs,
the third LED channel comprises five LEDs, wherein the first end of the third LED channel is connected in between the initial LEDs and the subsequent LEDs of the first LED channel, and wherein the second end of the third LED channel is connected in between the initial LEDs and the subsequent LEDs of the second LED channel.

The above described example is a practical implementation of the LED based lighting device.

The controller may, for example, activate the second LED channel. In this case, the current will flow through the five initial LEDs followed by the five subsequent LEDs of the second LED channel.

The control may, for example, also activate the first LED channel. In this case, the current will flow through the five initial LEDs of the first LED channel. The current will then flow through either the five subsequent LEDs of the first LED channel or via the LEDs of the third LED channel and the five subsequent LEDs of the second channel, or a combination thereof. This also depends on the amount of current flowing through the second LED channel.

This is best explained as follows. The voltage over a particular LED is also dependent on the current flowing through the LED. The present disclosure thus makes use of the concept that the forward voltage of an LED is also dependent on the current flowing through the corresponding LED.

No current will flow through the third LED channel in case the current through the second LED channel is relatively large. This would mean that the voltage at the second end of the third LED channel is lifted due to the sum of the forward voltages of the subsequent LEDs in the second LED channel. The voltage over the LEDs in the third LED channel may then not be sufficient to make those LEDs to allow current to flow.

The above is thus related to the induced non-linearity of the present disclosure. In other words, a current will flow from the first LED channel, via the third LED channel, to the second LED channel given a particular total current ratio between the first LED channel and the second LED channel.

In a further example, a color temperature of the first chromaticity is lower than a color temperature of the second chromaticity.

In another example, the lighting device has two LED channels.

In yet another example, the first LED channel is arranged to emit light having a temperature of 2700 k, and wherein the second LED channel is arranged to emit light having a temperature of 6500K.

It is noted that the controller may be any of a Pulse Width Modulation, PWM, based controller, or a linear operated controller. A PWM based controller means that the controller may control switches present in the channels for activating the corresponding channels using PWM control signals. This would mean that a particular LED channel is either on, or off. A linear operated controller may control each of the LED channels by providing a linear controller current through the corresponding LED channel. As such, the amount of current through the LED channel may not be fixed but may vary depending on the setting of the controller.

These and other aspects of the invention will be apparent from and elucidated with reference to the embodiment(s) described hereinafter.

DETAILED DESCRIPTION

Figure 1:
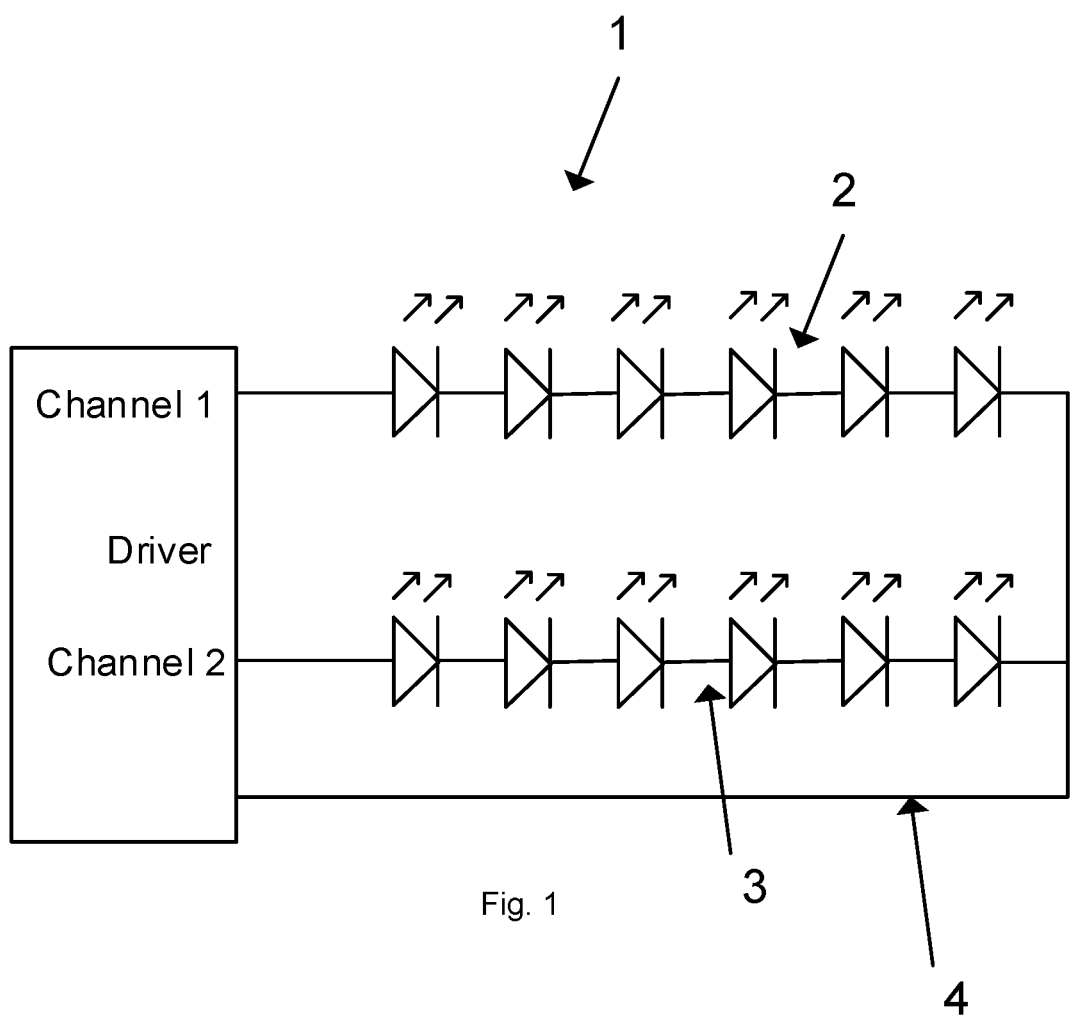
FIG. 1 shows a Light Emitting Diode, LED, based lighting device having two LED channels in accordance with the prior art.

FIG. 1 shows a Light Emitting Diode, LED, based lighting device 1 having two LED channels in accordance with the prior art.

The LED based lighting device 1 comprises a driver that is equipped for driving two different channels 2, 3. The first LED channel 2 may be arranged for emitting a color having a temperature of 2700K, which is also known as Warm White. The second LED channel may be arranged for emitting a color having a temperature of 6500K, which is also known as Daylight White. By combining both channels, colors between the Warm White color and the Daylight White color can be obtained.

The LED based lighting device 1 has a single return line as indicated with reference numeral 4. The return line is used for any current originating from the first LED channel 2 and the second LED channel 3.

Figure 2:
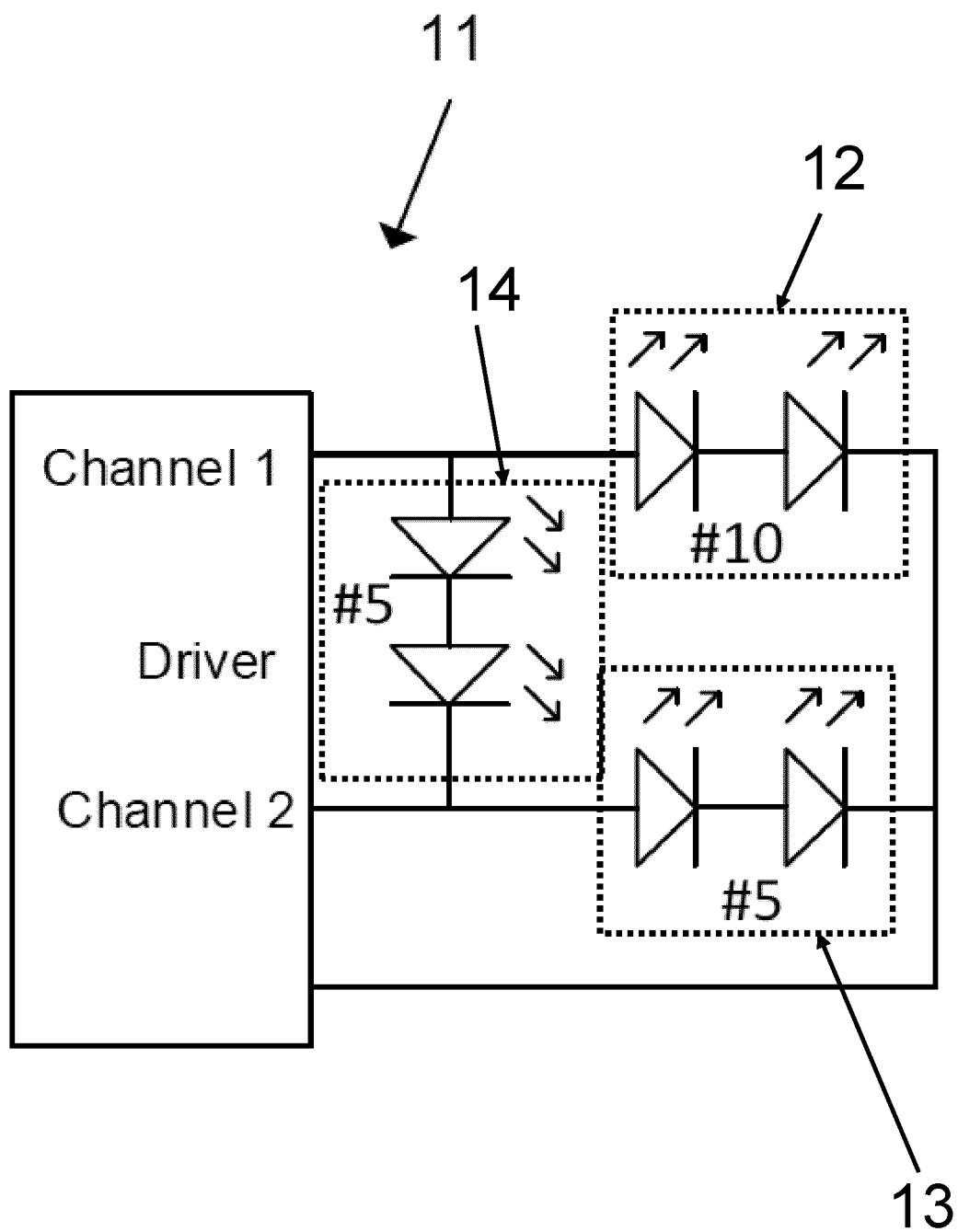
FIG. 2 shows an LED based lighting device having two LED channels in accordance with the present disclosure.

FIG. 2 shows an LED based lighting device 11 having two LED channels in accordance with the present disclosure.

The LED based lighting device 11 has two channels as indicated with the wording "Channel 1" and "Channel 2". The first channel 12 can have at least one LED and is tuned for emitting light having a first chromaticity. The second channel 13 can have at least one LED and is tuned for emitting light having a second chromaticity. The Light Emitting Diode, LED, based lighting device 11 is arranged for emitting a particular emitted light following a Planckian locus in a color space. More specifically, the first channel 12 may be arranged for emitting a color having temperature of 2700K and the second channel 13 may be arranged for emitting a color having a temperature of 6500K. The LED based lighting device 11 comprises a third LED channel 14 connected in between an input of the first LED channel 12 and an input of the second LED channel 13. The third LED channel 14 has at least one LED that is tuned to emit light having a third chromaticity in said the color space. The third LED branch 14 channel effectuates that the at least one LED of the second LED channel 13 is activated when the first channel is actuated. The third LED channel 14 can emit light with a red color to create a warmer effect in the total light output of the LED based lighting device 11.

The present LED based lighting device 11 is arranged for emitting a particular emitted light following a Planckian locus in a color space.

In physics and color science, the Planckian locus or black body locus is the path or locus that the color of an incandescent black body would take in a particular color space, i.e. chromaticity space, as the blackbody temperature changes. It goes from deep red at low temperatures through orange, yellowish white, white, and finally bluish white at very high temperatures.

In accordance with the present disclosure, a color space is a three-dimensional space. That is, a particular color may be specified by a set of three numbers, for example the CIE coordinates X, Y, and Z, or other values such as hue, colorfulness, and luminance.

The present disclosure is not limited to the way in which the three numbers are constituted.

A chromaticity is a color projected into a two-dimensional space that ignores brightness. For example, the standard CIE XYZ color space projects directly to the corresponding chromaticity space specified by the two chromaticity coordinates known as x and y, making the familiar chromaticity diagram shown in FIG. 4.

Figure 4:
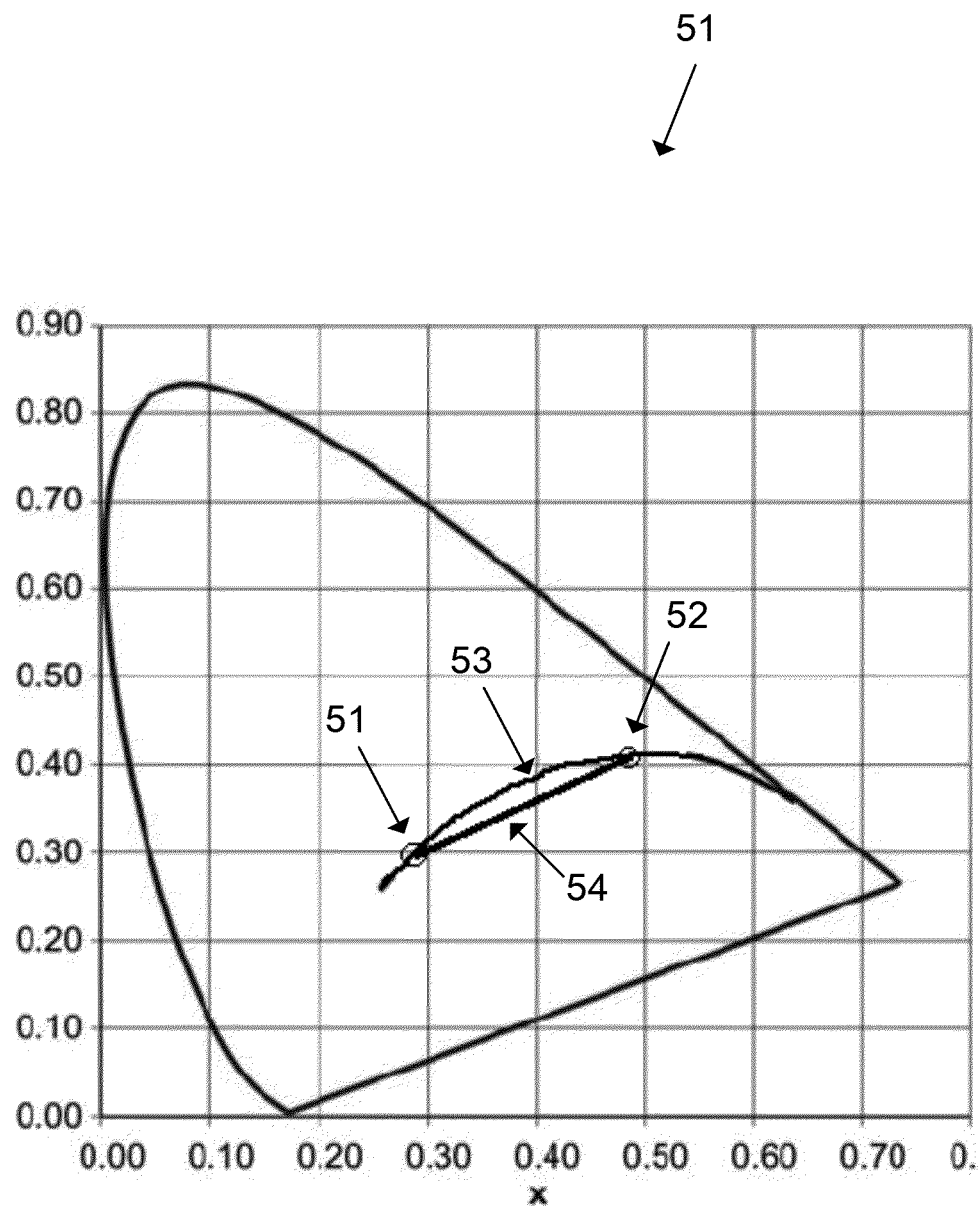
FIG. 4 shows a chromaticity diagram illustrating the concept of a Planckian locus.

The Planckian locus, the path that the color of a black body takes as the blackbody temperature changes, is often shown in this standard chromaticity space, which is explained in more detail with respect to FIG. 4. Preferably, a sum of a forward voltage of the second LED channel and a forward voltage of the third LED channel is equal to a forward voltage of the first LED channel.

Figure 3:
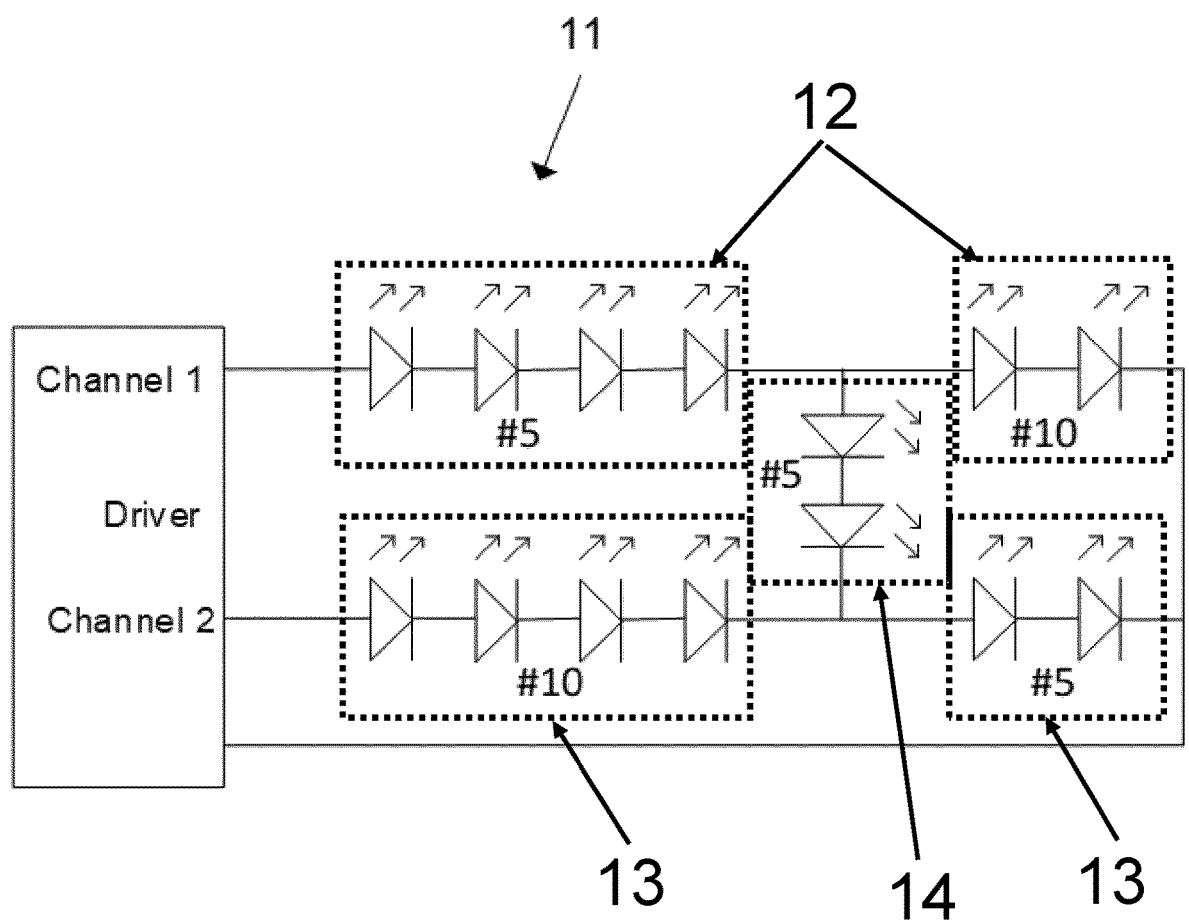
FIG. 3 shows a further LED based lighting device having two LED channels in accordance with the present disclosure.

In FIG. 3, a further LED based lighting device 11 having two LED channels in accordance with the present invention in described. The first LED channel 12 comprises a plurality of initial LEDs followed by a plurality of subsequent LEDs. In this particular example, five initial LEDs are shown as indicated with reference sign "#5", and ten subsequent LEDs are shown as indicated with reference sign "#10".

The initial LEDs and the subsequent LEDs may be of the same type. That is, each of the LEDs may be arranged to emit a color having a temperature of 2700K.

The second LED channel 13 comprises a plurality of initial LEDs followed by a plurality of subsequent LEDs. In this particular example, ten initial LEDs are shown as indicated with reference sign "#10", and five subsequent LEDs are shown as indicated with reference sign "#5".

The LED based lighting device 11 comprises a third LED channel 14 connected in between the at least two LED channels, wherein the third LED channel 14 comprises one or more LEDs and wherein the third LED channel 14 is tuned to emit light having a third chromaticity in the color space, wherein the third LED channel 14 effectuates that at least one LED of the second LED channel 13 is activated when the first channel 12 is actuated, thereby ensuring that the emitted light follows the Planckian locus in the color space in between the first and the second chromaticity in the color space.

In this particular case, the third LED channel 14 comprises five LEDs as indicated with the reference signs "#5", wherein the first end of the third LED channel 14 is connected in between the initial LEDs and the subsequent LEDs of the first LED channel 12, and wherein the second end of the third LED channel 14 is connected in between the initial LEDs and the subsequent LEDs of the second LED channel 13.

FIG. 4 shows a chromaticity diagram 51 illustrating the concept of a Planckian locus.

Here, reference sign 51 indicates the point in the chromaticity diagram that is associated with the second LED channel 13 and reference sign 52 indicates the point in the chromaticity diagram that is associated with the first LED channel 12. In the prior art situation, as described with respect to FIG. 1, the LED channels can be combined such that the color emitted by the LED based lighting device follows the straight line 54 between the two points 51, 52.

The LED based lighting device in accordance with the present disclosure is arranged to follow the Planckian locus between the two points 51, 52, as indicated with reference sign 53.

Figure 5:
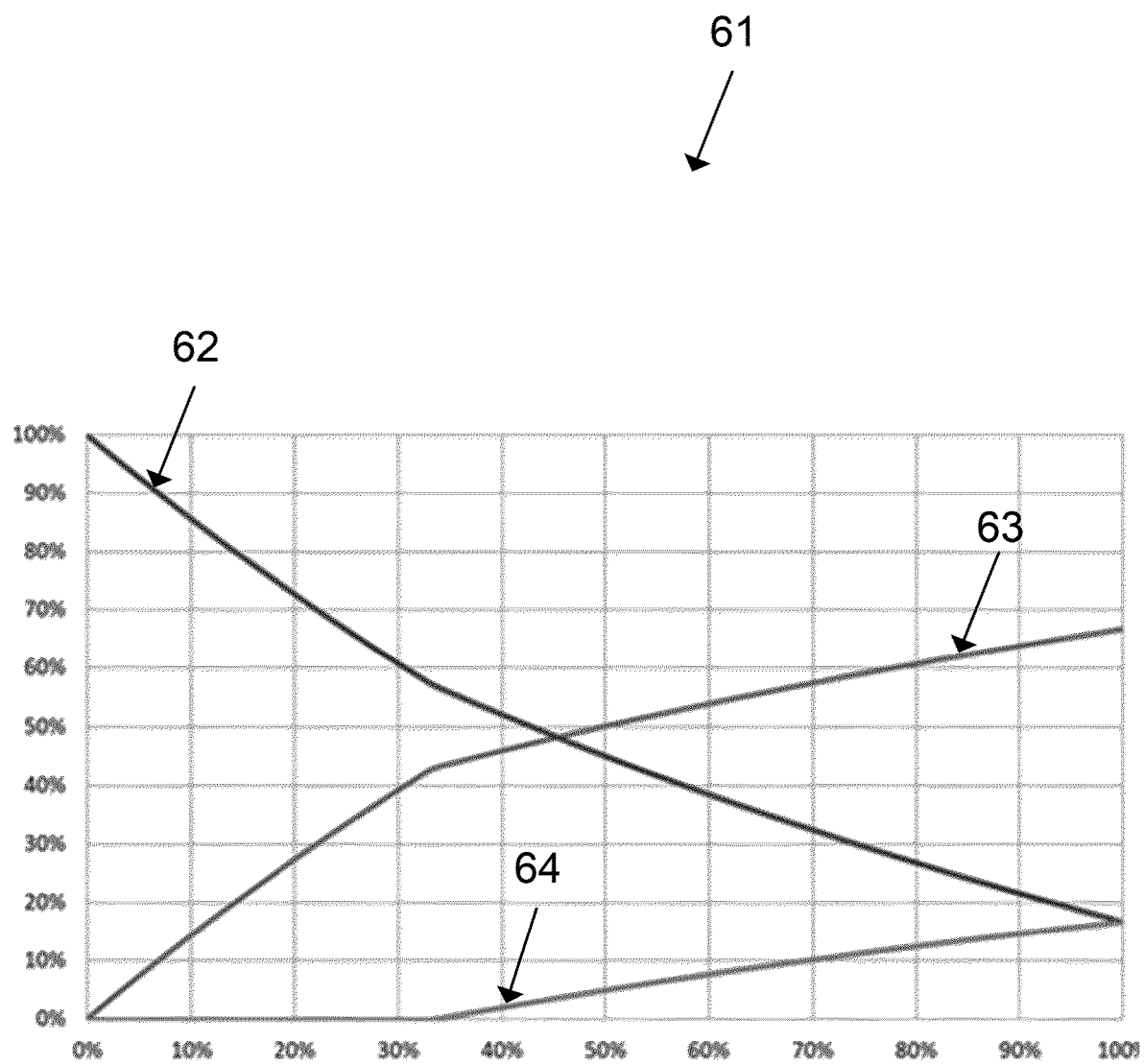
FIG. 5 shows an example of a graph illustrating a Flux ratio versus current ratio in accordance with the present disclosure.

FIG. 5 shows an example of a graph 61 illustrating a Flux ratio versus current ratio in accordance with the present disclosure.

Reference sign 62 indicates the ratio of the flux originating from the second LED channel 13, reference sign 63 indicates the ratio of the flux originating from the first LED channel 12 and reference sign 64 indicates the ratio of the flux originating from the third LED channel 14.

As shown in the figure, the third LED channel 14 only comes into play once a certain ratio of current between the first LED channel 12 and the second LED channel 13 occurs. That is, if a small amount of current flows through the first LED channel 12, then it's likely that that amount of current does not flow through the third LED channel 14. This is explained as follows.

A large amount of current flowing through the second LED channel 13 causes the potential at the cathode side of the third LED channel 14 to increase due to the forward voltages of the subsequent LED of the second LED channel 13. This would lead to the effect that the voltage over the third LED channel 14 is too low for the LEDs in the third LED channel 14 to start conducting.

Once the ratio between the current through the first LED channel 12 and the second LED channel 13 reaches a certain threshold, the LEDs in the third LED channel 14 will start conducting current. This is shown at around the 35% mark in the horizontal axis. In this case, the voltage of the third LED channel 14 is just over a threshold voltage such that the LEDs in the third LED channel 14 start conducting current. The current that is injected into the first LED channel 12 is then split between the current through the third LED channel 14 and the current through the subsequent LEDs present in the first LED channel 12. This is shown in the figure by the nod present in the flux origination from the first LED channel 12 at around 35% in the horizontal axis.

The above thus indicates that the current through the first LED channel 12 does not immediately split itself such that current is flowing through the third LED channel 14. The third LED channel 14 only comes into play once a certain ratio of current between the first LED channel 12 and the second LED channel is obtained 13. That is, the third LED channel 14 starts conducting current when the ratio between the current through the first LED channel 12 and the current through the second LED channel 13 is above a predetermined threshold. This causes a desired non-linearity as this causes the color to follow the Planckian locus in a closer manner.

Other variations to the disclosed embodiments can be understood and effected by those skilled in the art in practicing the claimed invention, from a study of the drawings, the disclosure, and the appended claims, In the claims, the word "Comprising" does not exclude other elements or steps, and the indefinite article "a" or "an" does not exclude a plurality. A single processor or other unit may fulfil the functions of several items recited in the claims. The mere fact that certain measures are recited in mutually different dependent claims does not indicate that a combination of these measures cannot be used to advantage. A computer program may be stored/distributed on a suitable medium, such as an optical storage medium or a solid-state medium supplied together with or as part of other hardware, but may also be distributed in other forms, such as via the Internet or other wired or wireless telecommunication systems. Any reference signs in the claims should not be construed as limiting the scope thereof.

The invention claimed is:

1. A Light Emitting Diode (LED) based lighting device arranged for emitting a particular emitted light following a Planckian locus in a color space, wherein the LED based lighting device comprises:
   a first LED channel comprising at least one LED, wherein the first LED channel is tuned to emit light having a first chromaticity in the color space;
   a second LED channel comprising at least one LED, wherein the second LED channel is tuned to emit light having a second chromaticity in the color space;
   a controller having at least two outputs, one for activating the first LED channel and another for activating the second LED channel such that the LED based lighting device emits light having a color in between the first and the second chromaticity in the color space;
   wherein the LED based lighting device further comprises:
   a third LED channel connected in between an input of the first LED channel and an input of the second LED channel, wherein the third LED channel comprises at least one LED and wherein the third LED channel is tuned to emit light having a third chromaticity in the color space, wherein the third LED channel effectuates that the at least one LED of the second LED channel is activated when the first channel is actuated.

2. The LED based lighting device in accordance with claim 1, wherein a sum of a forward voltage of the second LED channel and a forward voltage of the third LED channel is equal to a forward voltage of the first LED channel.

3. The LED based lighting device in accordance with claim 1, wherein the first LED channel comprises a plurality of LEDs and wherein the second LED channel comprises a plurality of LEDs, and wherein the third LED channel is connected, at a first end, in between the plurality of LEDs of the first LED channel and, at a second end opposite to the first end, in between the plurality of LEDs of the second LED channel.

4. The LED based lighting device in accordance with claim 3, wherein the number of in series cascaded LED's in the first channel that are connected with their anode side to the first end of the third LED channel equals the number of in series connected LEDs in the third LED channel plus the number of in series connected LEDs in the second LED channel that are connected with their anode side to the second end of the third LED channel.

5. The LED based lighting device in accordance with claim 4, wherein:
   the first LED channel comprises five initial LEDs followed by ten subsequent LEDs;
   the second LED channel comprises five initial LEDs followed by five subsequent LEDs, and
   the third LED channel comprises five LEDs, wherein the first end of the third LED channel is connected in between the initial LEDs and the subsequent LEDs of the first LED channel, and wherein the second end of the third LED channel is connected in between the initial LEDs and the subsequent LEDs of the second LED channel.

6. The LED based lighting device in accordance with claim 1, wherein a color temperature of the first chromaticity is lower than a color temperature of the second chromaticity.

7. The LED based lighting device in accordance with claim 1, wherein the LED based lighting device has two LED channels.

8. The LED based lighting device in accordance with claim 1, wherein the first LED channel is arranged to emit light having a temperature of 2700 k, and wherein the second LED channel is arranged to emit light having a temperature of 6500K.

9. The LED based lighting device in accordance with claim 1, wherein the controller is:
   a Pulse Width Modulation (PWM) based controller.

10. The LED based lighting device in accordance with claim 9, wherein the controller is arranged to provide a first current to the first LED channel and a second current to the second channel.

11. The LED based lighting device in accordance with claim 1, wherein the controller is a linear operated controller.

12. The LED based lighting device in accordance with claim 11, wherein the controller is arranged to provide a first current to the first LED channel and a second current to the second channel.

\* \* \* \* \*